(12) United States Patent
Yen et al.

(10) Patent No.: US 8,536,253 B2
(45) Date of Patent: *Sep. 17, 2013

(54) METHOD FOR PRODUCING RUBBERIZED CONCRETE USING WASTE RUBBER TIRES

(71) Applicant: Chun Well Industry Co., Ltd., Taipei (TW)

(72) Inventors: Kuo-Ji Yen, Taipei (TW); Maw-Tien Lee, Chia-Yi (TW); Shou-Ming Lee, Taipei (TW); Jen-Ray Chang, Minhsiung Township (TW); Liang-Hsign Chou, Chia-Yi (TW)

(73) Assignee: Chun Well Industry Co. Ltd., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,164

(22) Filed: Oct. 1, 2012

(65) Prior Publication Data

US 2013/0030088 A1    Jan. 31, 2013

Related U.S. Application Data

(63) Continuation-in-part of application No. 13/078,913, filed on Apr. 1, 2011, now Pat. No. 8,338,506.

(51) Int. Cl.
*C08G 63/02*    (2006.01)
*C08G 64/00*    (2006.01)

(52) U.S. Cl.
USPC .............. 524/8; 524/17; 106/357; 106/5

(58) Field of Classification Search
USPC ................. 524/8, 17, 35; 106/705
See application file for complete search history.

(56) References Cited

U.S. PATENT DOCUMENTS 8,338,506 B2 * 12/2012 Yen et al. ............... 524/8

\* cited by examiner

*Primary Examiner* — Terressa Boykin
(74) *Attorney, Agent, or Firm* — Cascio & Zervas

(57) ABSTRACT

Catalytic partial oxidation using a metal oxide catalyst surface treats crumb rubber that is recovered from waste rubber tires. Advantages of using catalytically oxidized crumb rubber relative to using non-catalytically oxidized crumb rubber in making the rubberized concrete, includes superior mechanical strength and water-repealing capability, lower oxidation temperature and shorter oxidation time, and accelerated hydration times. Rubber oil (a gas condensate) co-produced from the crumb rubber partial oxidation process is equal to or better than the commercial superplasticizers. Industrial scale partial oxidation employs a continuous flow tubular reactor where a crumb rubber/catalyst mixture is fed into the reactor co-currently with an air/nitrogen mixture.

20 Claims, 8 Drawing Sheets

METHOD FOR PRODUCING RUBBERIZED CONCRETE USING WASTE RUBBER TIRES

REFERENCE TO RELATED APPLICATIONS

This application is a continuation-in-part of U.S. patent application Ser. No. 13/078,913 filed on Apr. 1, 2011, which is incorporated herein and which is now U.S. Pat. No. 8,338,506.

FIELD OF THE INVENTION

The present invention relates generally to rubberized concrete that is made from waste rubber tires that are surface treated through catalytic partial oxidization using metal oxide catalysts. Benefits of using catalytically oxidized crumb rubber as compared to non-catalytically oxidized crumb rubber include superior mechanical strength and water-repelling capability, lower oxidation temperature and shorter oxidation time, and accelerated hydration times. Rubber oil (a gas condensate) co-produced in the catalytic oxidation serves as a bonding agent with properties that are equal to or better than that of the commercial superplasticizers.

BACKGROUND OF THE INVENTION

Recycling and utilization of the rubber recovered from the waste tires has been the subject of intense study as the accumulation of waste rubber tires is a major environmental problem. U.S. Pat. Pub. No. 20070249762 to Sylvester describes rubber modified asphalt cement compositions in which rubber crumb is de-vulcanized using dodecylbenzene sulfonic acid (DBSA). DBSA also catalyze reactions of the de-vulcanized rubber with molecules present in asphalt. Rubberized concrete is another use for crumb rubber that is recovered from the waste tires. However, when hydrophobic rubber particle is in composite with hydrophilic cement, the mechanical strength of the resulting concrete is reduced significantly. U.S. Pat. No. 5,456,751 to Zandi et al, U.S. Pat. No. 5,762,702 to Guy, and U.S. Pat. Publication No. 20050096412 to Petr et al, conclude that mixing crumb rubber with the cement creates relatively weak physical bonding between the rubber particulates and cement matrix, which results in a significant reduction in the mechanical properties of the rubberized concrete that severely limits its application. Conventional rubberized concrete uses superplasticizers to improve the weak physical bonding between, the hydrophobic rubber particulates and the hydrophilic cement matrix to make the rubberized concrete composite acceptable for selected applications.

To improve the mechanical properties of the rubberized concrete, surface treatment methods have been developed to modify the crumb tire rubber so as to generate stronger physical/chemical bonding or substantially stronger chemical bonding with the surrounding cement matrix. Segre et al. disclose sodium hydroxide treatment to enhance the adhesion of tire rubber particles to the cement paste, but the resulting rubberized concrete still showed a 33% reduction in the compression strength as compared to the conventional concrete. (Segre, N.; Joekes, I., "Use of tire rubber particles as addition to cement paste", *Cement and Concrete Research* 2000, 30 (9), 1421-1425). U.S. Pat. No. 5,849,818 to Walles, et al. discloses a method to sulfonate the outer layer of rubber particles by treatment with a reactant gas containing sulfur trioxide. The rubber (polymer) particles are covered with a skin of the sulfonate layer containing a high amount of sulfonic acid or sulfonate moieties. These sulfonated particles are used as articles of manufacture such as aggregates in cements, organic resins, cellulosics, and so forth, with beneficial properties being imparted to the composite. In particular, concrete can be made from Portland cement that incorporates these aggregates.

SUMMARY OF THE INVENTION

Partial oxidation of crumb rubber derived from environmental hazardous waste tires yields surface treated crumb rubber and a gas condensate which are used as blending stocks for making rubberized concrete with improved mechanical strength as compared to the conventional rubberized concrete. In general, partial oxidation changes the surface of sulfur-containing crumb rubber from hydrophobic to hydrophilic. The treated rubber surface containing sulfones, sulfoxides, and organic sulfur trioxides functional groups (R—$SO_x$—R) interacts more strongly with the hydrophilic surface of the surrounding cement matrix for improving the mechanical strength of the rubberized concrete. The hydrophilic, chemically robust rubber surface interacts strongly with the hydrophilic surface of surrounding cement matrix. Gas condensate co-produced in the partial oxidation reactor consists mainly of active sulfur oxides (R—$SO_x$—R) and serves as an excellent bonding agent to further enhance the bonding strength between the partially oxidized crumb rubber and the cement mixes. The mechanically improved rubberized concrete is more versatile than conventional rubberized concrete. The rate of the partial oxidation in non-catalytic reactions however is quite slow and therefore requires high reaction temperatures ranging from 200 to 300° C. and long residence times ranging from 45 to 120 minutes.

The present invention is based in part on the development of metal oxide catalyzed partial oxidation techniques, for treating the surface of crumb rubber at significantly lower temperatures and much reduced treatment times, to enhance surface properties of the crumb rubber. It has been demonstrated that so-modified crumb rubber particles derived by catalystic partial oxidation exhibits significantly better adhesion with surrounding cement matrix than modified crumb rubber particles made by non-catalylics oxidation. Catalytic oxidation of crumb rubber surface is carried out not only at significantly lower temperature and shorter time, but the process also generates more hydrophilic active functional groups on the rubber surface to interact even more strongly with the hydrophilic cement than the non-catalyzed methods. Preferred metal oxide catalysts include, for example, ferrous oxide (FeO) and ferric oxide ($Fe_2O_3$). No other catalyst is required. That is the partial oxidation can be catalyzed by one or more catalysts that consist of or that consist essentially of suitable metal oxides.

In a preferred embodiment where FeO or $Fe_2O_3$ catalyst is employed, Fourier transform infrared (FT-IR) spectroscopy analysis of the surface of partially oxidized crumb rubber suggests that generating the maximum number of R—$SO_x$—R functional groups on the surface of crumb rubber by avoiding over oxidation is achieved by optimum partial oxidation conditions at approximately 150° C. for 20 min. and at approximately 200° C. for 30 min., respectively. Industrial scale, continuous partial oxidation preferably employs a horizontal tubular reactor that is equipped with a motor-driven multi-blade horizontal mixer. The crumb rubber and catalyst powder mixture is transported through the reactor at a controlled rate to provide the desired reaction time. The gaseous oxidant flows thorough the reaction zone concurrently with the mixture.

The catalytic partial oxidation reaction also generates a novel bonding agent for the crumb rubber and cement matrix. This byproduct residue results when minor portions of crumb rubber is converted into rubber oil (that is in the from of a gas condensate) in the metal oxide catalyzed oxidation process. A small portion of this rubber oil is trapped with the oxidized rubber crumbs making them slightly sticky in appearance. This bonding agent has properties that are comparable to or better than those of commercial superplasticizers. Accordingly, rubberized concrete made with catalytically partial oxidized rubber particles and the trapped bonding agent does not require a commercial superplasticizer which is expensive. Advantages of using catalytically oxidized over non-catalytically oxidized crumb rubber for making the rubberized concrete was also demonstrated by FT-IR spectroscopy, x-ray diffraction (XRD), and scanning electron microscopy. FT-IR spectra of the rubber oil show much stronger signal of the R—$SO_x$—R functional groups than that on the surface of partially oxidized crumb rubber. This implies that the rubber oil is mostly made of short chain R—$SO_x$—R components (R—SO—R, R—$SO_x$—R, and R—$SO_3$), which can greatly enhance the bonding strength between the partially oxidized crumb rubber and the cement matrix.

One surprising feature of hydrated mortar made with catalytically oxidized crumb rubber and cement is its superior ability to repel moisture as compared to either hydrated mortar that is made with non-catalytically oxidized rubber and cement or untreated rubber and cement. The hydrophobic nature of the rubberized concrete of the present invention makes it particularly suitable for roofing, bridge foundation, and seawall construction and other marine applications.

DETAILED DESCRIPTION OF THE PREFERRED EMBODIMENTS

Figure 1:
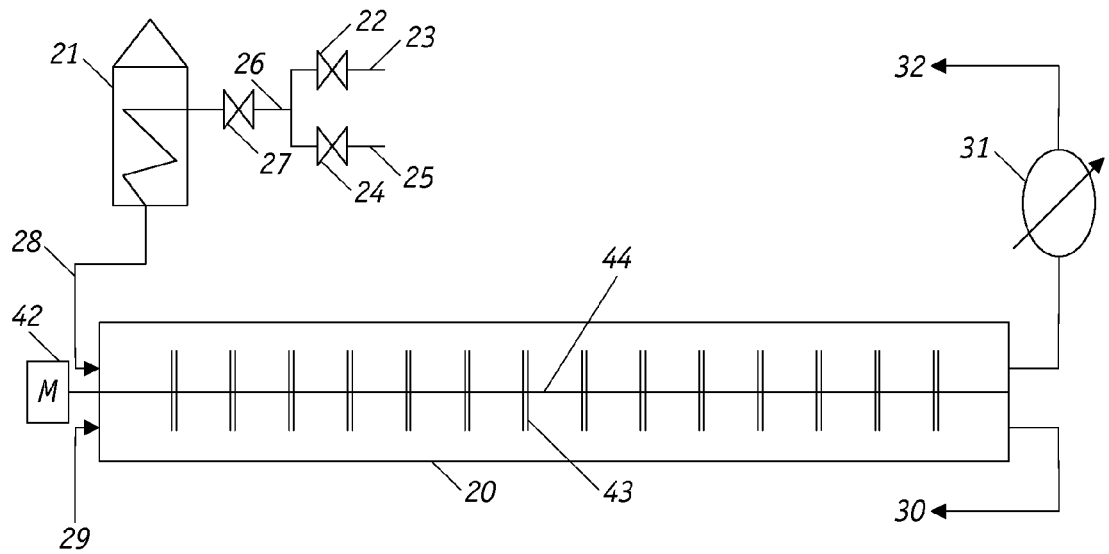
FIG. 1 is a schematic diagram of a continuous partial oxidation reactor.

A cost effective method of enhancing the mechanical properties of the rubberized concrete uses surface-treated crumb rubber particles that form strong bonds with the surrounding cement matrix through stronger physical/chemical bonding or substantially stronger chemical bonding. Surface treatment consists of converting sulfide functional groups (—S—) on the surface of crumb rubber into sulfone groups (—$SO_2$) or sulfoxide groups (—S=O) through partial, oxidation. This process changes the crumb rubber surface from a hydrophobic to a hydrophilic one which promotes effective mixing of the modified crumb rubber particles with the hydrophilic cement; in addition, the process converts the surface —S— groups into more active —$SO_2$ and —S=O groups which form strong chemical bonds with surrounding cement matrix during hydration.

Organic sulfur compounds (R—S—R) can be oxidized into organic sulfoxides (R—SO—R), organic Sulfones (R—$SO_2$—R), and organic trioxides (R—$SO_x$) under controlled conditions, and into $SO_x$ gases under over oxidation conditions. In the crumb rubber particles, 'R' represent the rubber components connected to the sulfur-containing functional group. The sulfoxide functional group (—S=O) is more active than the sulfone group (—$SO_2$) which, in turn, is more active than the sulfide group (—S—). For example, dimethyl sufoxide is chemically more active than dimethyl sulfone and much more active than dimethyl sulfide.

With the present invention, by incorporating metal oxide catalyzed partially oxidized rubber particles and co-produced gas condensate into cement mixes, rubberized concrete having improved compressive strength, flexural strength, and tensile strength can be produced. Conventional concrete is a hardenable mixture comprising cementitious materials (or cement mixes), a fine aggregate such as sand, a coarse aggregate, and water. The relative proportions of the components in concrete compositions can vary depending on the desired properties of the cured product. See, for example, U.S. Pat. No. 5,624,491 to Liskowitiz et al. and U.S. Pat. No. 5,456,751 to Zandi et al, which are incorporated herein by reference.

The oxidized rubber particles of the present invention will typically comprise 0.1 to 20 wt %, preferably 2 to 10 wt % and more preferably from 3.0 to 7.5 wt % of the concrete composition. When added, the liquid bonding agent (gas condensate) will typically comprise at least 0.1 wt % and preferably from 0.1 wt % to 1.0 wt % of the concrete composition.

By incorporating the oxidized rubber particles, proportionally less coarse aggregate material needs to be used. Because of the superior mechanical properties achieved with the gas condensate, no superplasticizer is required to make the rubberized concrete of the present invention. Concrete compositions made with the partially oxidized rubber particles will exhibit superior mechanical strengths.

As compared to mechanical strengths of the rubberized concrete containing non-catalytically partially oxidized rubber disclosed in U.S. patent application Ser. No. 13/078,913 to Yen et al, it is expected that inventive concrete compositions containing metal oxide catalyzed, partially oxidized rubber and trapped bonding agent from co-produced gas condensate will have a (1) compressive strength of at least 40 MPa and preferably from 40 to 60 MPa after being cured for about 50 days or more, (2) a flexural strength of at least 5.4 MPa and preferably from 5.4 MPa to 6.6 MPa after being cured for about 50 days or more; and (3) a tensile strength of at least 2.9 MPa and preferably from 3.1 MPa to 3.4 MPa after being cured for about 50 days or more. These properties should be further enhanced by the inclusion of additional bonding agent co-produced in this catalytic oxidation process.

With the present invention, by incorporating the catalytically oxidized crumb rubber into cement mixes, the rubberized concrete exhibits stronger mechanical strength than ordinary concrete after being cured for just 7 days. This feature is evidenced by the significantly stronger C—S—H signals in the vicinity of 878, 670 and 1000 $cm^{-1}$ wave numbers in FT-IR spectrum. This appears to be mainly due to increased formation of R—$SO_x$—R functional groups on the surface of crumb rubber under catalytic oxidation as compared to non-catalytic oxidation. CS ($3CaO.SiO_2$ or $Ca_3SiO_5$) and $C_2S$ (2CaOSiO$_2$ or Ca$_2$SiO$_3$) are the main components in cement that form C—S—H bonds during hydration and these strong bonds are the basis for the mechanical characteristics of the concrete. Evidence suggests that incorporating catalytically oxidized crumb rubber into cement paste also accelerates the hydration process of rubberized concrete.

The benefits of using catalytically oxidized crumb rubber relative to using non-catalytically oxidized crumb rubber in making rubberized concrete have been demonstrated with x-ray diffraction (XRD) analysis. The crystalline peak of C$_3$S/C$_2$S/C—S—H in XRD spectrum for rubberized concrete containing catalytically oxidized rubber is stronger than that for rubberized concrete containing non-catalytically oxidized rubber. This is due likely due to increased formation of R—SO$_x$—R functional groups on the surface of crumb rubber under catalytic oxidation. The increased XRD crystallinity signal of C$_3$S/C$_2$S/C—S—H suggests stronger mechanical strength of the rubberized concrete.

Scanning electron microscopy (SEM) was also used to observe the crystal and surface morphology of the hydration products of rubberized concrete that consist of catalytically or non-catalytically oxidized crumb rubber. The surface morphology of rubberized concrete sample made from catalytically oxidized rubber and cement shows a fine needle crystalline surface with no observable interface between the catalytically oxidized rubber and cement. This surface morphology is similar to the SEM image of hydrated mortar comprising ordinary concrete and a superplasticizer showing the Ettringite needle crystalline surface. The hydrophilic surface R—SO$_x$—R groups of the catalytically oxidized rubber with trapped gas condensate apparently have the same function as the hydrophilic SO$_3$ component in superplasticizers to form a fine needle crystialline surface to enhance bonding between the crumb rubber and the cement. The catalytically oxidized crumb rubber with trapped gas condensate thus serves as a superplasticizer to improve the mechanical strength and shorten the hydration time of the rubberized concrete.

Another surprising aspect of the present invention is that hydrated mortar comprising catalytically oxidized crumb rubber and cement is hydrophobic and thus readily repels water from the surface.

Industrial scale partial oxidation of crumb rubber is preferably conducted in a continuous reactor system as depicted in FIG. 1 where the operating parameters are controlled to maximize the generation of desirable surface R—SO$_x$—R functional groups while avoiding over oxidation that would otherwise produce excessive gas condensate and toxic SO$_x$ gas. Air from line 23 and nitrogen gas from line 25 are mixed in line 26 to maintain the oxygen concentration of the gas mixture in the range of $0.1 \times 10^{-3}$ to $100 \times 10^{-3}$ mole, preferably $1.0 \times 10^{-3}$ to $50 \times 10^{-3}$ mole, and more preferably $5.0 \times 10^{-3}$ to $10 \times 10^{-3}$ mole by adjusting valves 22 and 24. The gas mixture flows through valve 27 is heated in a pre-heater 21 to a predetermined temperature that is in the range of 25 to 300° C., preferably from 50 to 250° C., and more preferably from 100 to 200° C.

The preheated gas mixture is fed via line 28 to a horizontal tubular reactor 20 that is fed with a crumb rubber and catalyst mixture feed from line 29 that is preferably co-current with line 28. A motor-driven horizontal auger 42 equipped with helical screw blades 43 agitates and mixes the crumb rubber and catalyst powder mixture as the particles are pushed through reactor 20. The rotation speed of shaft 44 is regulated in order to achieve the desired reaction time that typically ranges from 5 to 60 min., preferably from 10 to 45 min., and more preferably from 15 to 30 min. Partially oxidized crumb rubber, with a sticky and oily appearance, which is caused by trapped gas condensate, exits through line 30. The gas stream withdrawn from reactor 20 is partially condensed in cooler 31 where gas condensate (rubber oil) is removed from line 32.

The primary source of crumb rubber particles is discarded tires. The crumb rubber is separated from the steel wires, glass fibers, or non-rubber materials in the waste tires, and is recovered by cryogenic freezing with liquid nitrogen or other suitable means, and then mechanically grounded and screened into irregular particles with the desirable sizes. It comprises natural rubber, styrene-butadiene rubber, butadiene rubber, butyl rubber, isoprene rubber, a significant amount of organic sulfur compounds for cross-linking to reinforce the strength of the cured rubber, and additives including zinc oxide, carbon black, calcium carbonate, and antioxidants, etc.

In operation, crumb rubber with particle sizes that typically range from 100-1,000 μm and preferably range from 300-600 μm is premixed with the metal oxide catalyst powder. The weight ratio of crumb rubber to catalyst powder typically ranges from 1000 to 0.1, preferably from 500 to 0.5, and more preferably from 100 to 1. Suitable metal oxide catalysts comprise the oxides of iron, vanadium, titanium, chromium, manganese, cobalt, nickel, zinc, copper, calcium, potassium, sodium, magnesium, and mixtures thereof. Preferred metal oxide catalysts are ferrous oxide (FeO) or ferric oxide (Fe$_2$O$_3$).

EXAMPLES

Crumb rubber samples as-received and that were partially oxidized at various temperatures and reaction times, with FeO or Fe$_2$O$_3$ catalysts, were prepared and analyzed.

Figure 2:
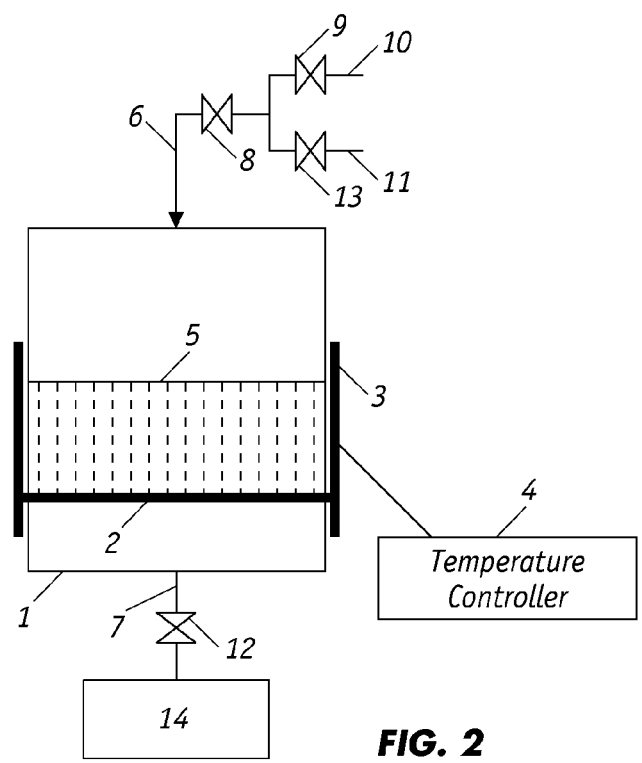
FIG. 2 is a schematic diagram of a laboratory batch partial oxidation reactor.

FIG. 2 illustrates the batch reactor system used to partially oxidize crumb rubber under catalytic or non-catalytic conditions. Cylindrical batch reactor vessel 1 is equipped with a meshed screen 2 to support a fixed bed 5 of the rubber and catalyst mixture within the reaction zone. (No catalyst is present under non-catalytic conditions.) Gas outlet pipe 7 is scaled with a container 14 of deionized water below valve 12, which retains the gas mixture in reactor 20. Gas inlet pipe 6 is connected to sources of air 10 and nitrogen 11. The nitrogen dilutes the oxygen concentration in the air to moderate the rate of oxidation. Valves 8, 9 and 13 regulate the flow of the air/nitrogen mixture, air and nitrogen, respectively. In operation, a mixture of nitrogen and air is fed into the reactor zone and through the porous rubber particle/catalyst bed at a controlled rate for a period of time sufficient for the desired oxygen concentration to be established; thereafter, valve 8 is closed, but valve 12 is kept open. The initial oxygen concentration in the reactor is maintained at between $0.1 \times 10^{-3}$ to $100 \times 10^{-3}$ mole.

The reactor vessel 1 is heated with an electrical heating ring 3 that is wrapped around the vessel's exterior; a thermal couple (not shown) measures the temperature in the reaction zone and signals therefrom are communicated to a temperature controller 4 that includes an electronic relay to regulate the temperature of heating ring 3. The reactor vessel is heated to a desired partial oxidation temperature that typically ranges from 25 to 300° C. Partial oxidation reaction is conducted for a predetermined period of time that typically ranges from 5 to 60 min. before the reactor is allowed to cool to room temperature.

Since the metal oxide catalyst, such as FeO or Fe$_2$O$_3$ is very effective in promoting oxidation of the —S— functional group on the crumb rubber surface, the partial oxidation is carried out at significantly lower temperatures and shorter reaction times, as well as much lower initial oxygen content in the reactor, as compared to the non-catalyst conditions. This prevents over oxidation of the surface sulfur of the crumb rubber which causes the removal of the sulfur molecules from the particle or particle surface (de-vulcanization of the rubber), producing toxic sulfur dioxide or sulfur trioxide gas, and excessive amount of gas condensate as the bonding agent, but not enough sulfone or sulfoxide functional groups on the crumb rubber surface.

The optimal partial oxidation temperature and reaction time employed depend, on among other things, on the catalyst activity of the metal oxide(s) used and the weight ratio of crumb rubber to catalyst powder.

Example 1

100 grams of waste rubber tire particles ranging in size from 300-600 μm were premixed with 1 gram of FeO catalyst powder and then inserted into a cylindrical batch reactor, as shown in FIG. 1, which had a reaction zone of approximately 8.2 cm in diameter and 19.5 cm in height. A mixture of nitrogen and air with an oxygen concentration of $7.5 \times 10^{-3}$ mole was fed into the reactor zone and through the porous crumb rubber bed at a controlled rate for a period of time sufficient to establish the desired oxygen concentration; thereafter, inlet valve 8 was closed, but the outlet valve (valve 12) remained open.

The vessel was then heated with an electrical heating ring to the partial oxidation temperature of 150, 200, 250 and 300° C. for separate experimental runs. The partial oxidation temperature was maintained and regulated by a relay controller as shown in FIG. 1. For each temperature, experimental runs were conducted separately for a partial oxidation time of 20, 30 and 60 minutes before the reactor is allowed to cool to room temperature (RT).

Partially oxidized crumb rubber, with a sticky and oily appearance, was first removed from the reactor. A portion of the gas condensate (light portion) was collected by rinsing the reactor with acetone as the "Rubber Oil", while the heavy portion of gas condensate dropped through the porous crumb rubber bed and into the container of water at the bottom of the reactor and which turned the water into emulsified "Sulfide Water". All the experimental runs were repeated with (i) $Fe_2O_3$ catalyst and with (ii) no catalyst for comparison. The FeO catalyst had a molecular weight of 71.85 and was from Hayashi Pure Chemical Industries Ltd, Japan (lot no. J030619025) and the $Fe_2O_3$ catalyst had a molecular weight 159.69 and had purity 96%; acid-insoluble 1.5% (max); water 1.5% (max); and manganese (as $MnO_2$) 0.5%. It was also from Hayashi (lot no. JJB0743).

Example 2

Surface functional groups on the partially oxidized rubber samples produced in Ex. 1 with FeO or $Fe_2O_3$ catalyst and without catalyst, as well as non-oxidized as-received rubber samples were subject to FT-IR spectroscopy. From their FT-IR spectra, it appears that the best partial oxidation was generated with the FeO and $Fe_2O_3$ catalysts at low temperatures ranging from 150-200° C. and short reaction time ranging from 20-30 min.

Figure 3:
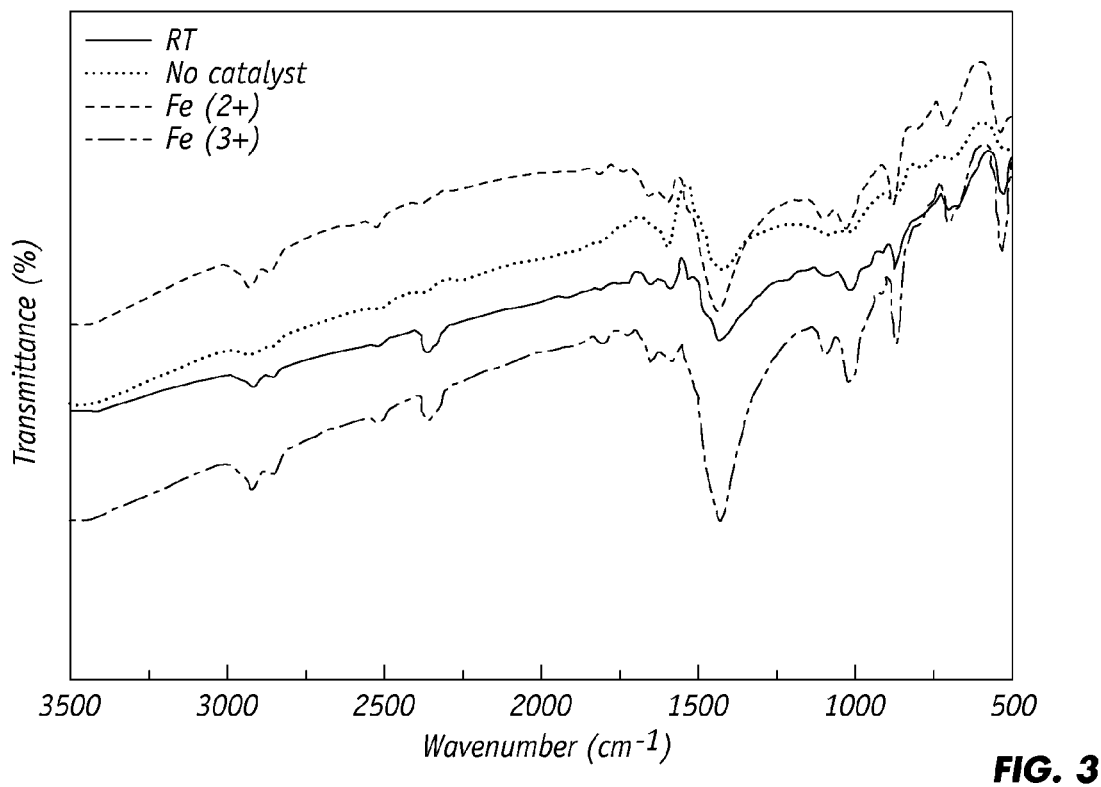
FIGS. 3 and 4 are FT-IR spectra of the surfaces of untreated rubber and partially oxidized rubber formed with and without metal oxide catalysts under different conditions.
Figure 4:
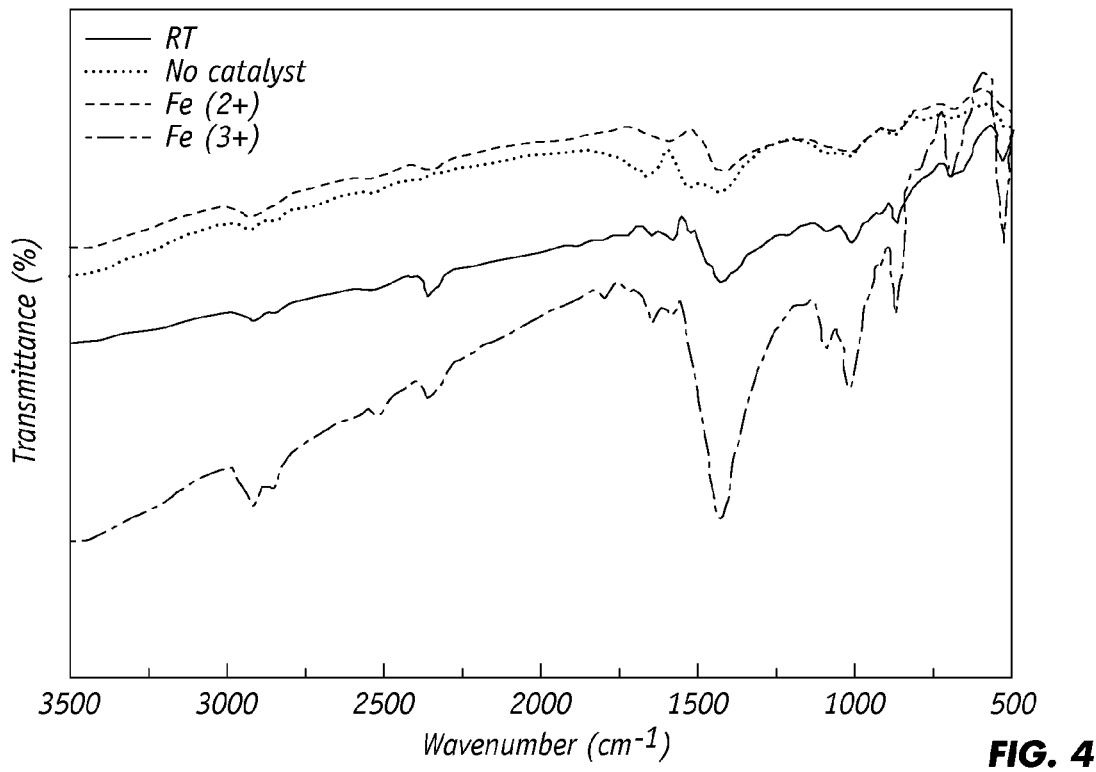

FIG. 3 are FT-R spectra of (1) untreated crumb rubber and (2) treated crumb rubber oxidized at 150° C. and 20 min with no catalyst, with FeO catalyst, or with $Fe_2O_3$ catalyst under initial oxygen concentrations of $7.5 \times 10^{-3}$ mole. All four curves show absorption in the vicinity of seven zones: 3,800-3,600 cm$^{-1}$ by O—H bond stretching, 2,700-2,900 cm$^{-1}$ and 850-950 cm$^{-1}$ by C—H bond stretching, 1,780-1,660 cm$^{-1}$ by C=O bond stretching, 1,500 cm$^{-1}$ by C—H bond bending, 1,100-1,000 cm$^{-1}$ by S=O stretching, 700-600 cm$^{-1}$ by C—S bond stretching, and 550-450 cm$^{-1}$ by S—S bond stretching. FIG. 4 are FT-IR spectra of (1) untreated crumb rubber and (2) treated crumb rubber oxidized at 200° C. and 30 min. with no catalyst, with FeO catalyst, or with $Fe_2C_3$ catalyst under initial oxygen concentration of $7.5 \times 10^{-3}$ mole.

Comparison of FIGS. 3 and 4 demonstrate that the absorption of all surface functional groups of crumb rubber oxidized with FeO or $Fe_2O_3$ catalyst are stronger than those oxidized without or as received (no treatment), especially, in the vicinities of S=O stretching, C—S stretching, S—S stretching, C—H bending and CH stretching. This is most likely caused by the higher conversion of the surface sulfur molecules into sulfoxide (R—SO—R) and/or sulfone (R—SO$_2$—R) moieties as promoted catalytically by FeO or $Fe_2O_3$ catalyst.

Example 3

Figure 5:
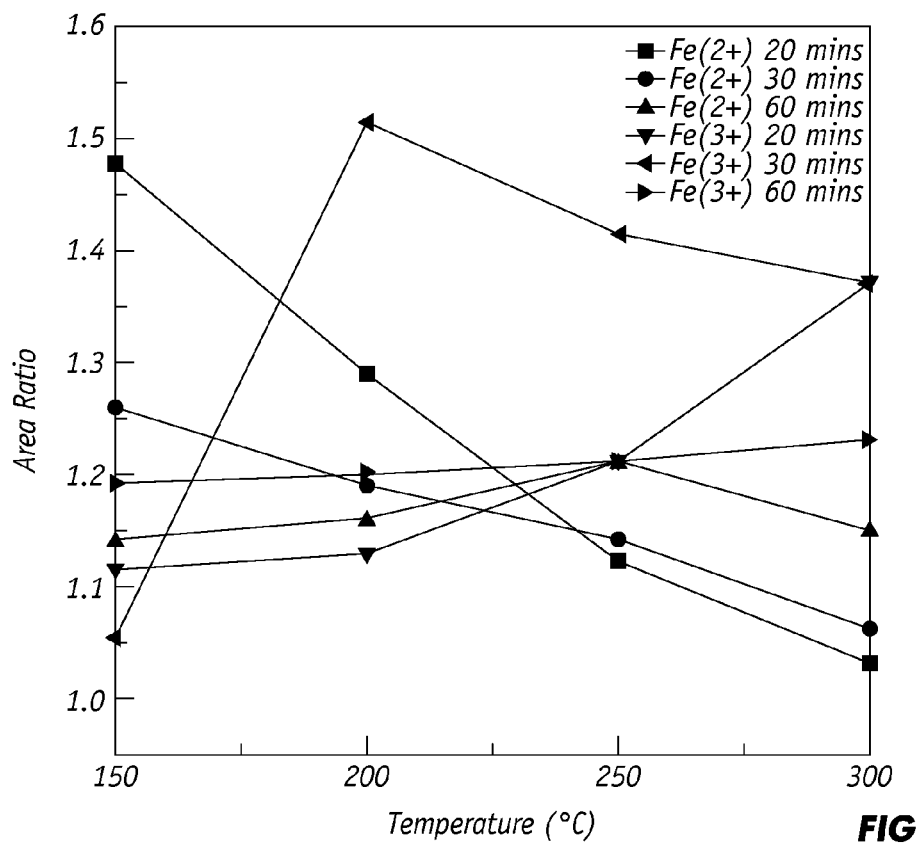
FIG. 5 is a plot of FT-IR area ratio (S=O stretching area/ $Sp^3$ C—H stretching area) vs. partial oxidation temperature for partially oxidized rubber formed with FeO and $Fe_2O_3$ catalysts at various oxidation times.

To search for optimal partial oxidation conditions for treating the crumb rubber, the area of the stretching absorption of sp$^3$ C—H bond and area of the stretching absorption of SO$_x$ (including SO$_2$ and SO) bonds were integrated. As shown in FIG. 5, the area ratio of SO$_x$/sp$^3$ C—H, which is an index for partial oxidation in forming desirable surface SO$_x$ groups, is plotted against the partial oxidation temperature, for crumb rubber samples that were oxidized with 20, 30, and 60 min, reaction times using FeO (Fe(2+)) or $Fe_2O_3$ (Fe(3+)) catalysts. It is apparent that the maximum area ratio for Fe(2+) catalyst/20 min. sample is approximately 1.48 at 150° C., which is among the highest of all the test results; the area ratio decreases sharply as the temperature rises from 200 to 300° C. The curve of the area ratio for the Fe(3+) catalyst/30 min. sample also rises to a maximum at 200° C., another high point of all the test results (approximately 1.52). For a longer treatment time of 60 min., the area ratio is at a significantly lower level between 1.1 and 1.2, regardless the treatment temperature or the catalyst used. FIG. 5 demonstrates that Fe(2+) and Fe(3+) catalysts promote oxidation of surface sulfur into more desirable surface SO$_x$ groups of the crumb rubber under greatly reduced reaction times and temperatures as compared to partial oxidation with no metal oxide catalysts.

In addition to favorable catalytic effects, the presence of Fe(2+) or Fe(3+) also appears to cause sulfur molecules on crumb rubber surface to compete with Fe molecules on the catalyst for the available oxygen molecules in the gas phase. As shown in FIG. 5, rate of the competing reactions is highest with the 20 or 30 min. reaction times and diminishes with longer (60 min.) reaction times. In other words, the action of the competing reactions significantly reduces the temperature for oxidizing surface sulfur compounds (R—S) on the rubber surface into surface sulfones (RSO$_2$) or sulfoxides (RSO), thereby reducing the likelihood of cracking them into lighter sulfones or sulfoxides as a part of gas condensate under higher temperatures. It is known that iron oxide (FeO) tends to decompose under heat (at temperatures below 576° C.) according to the self-oxidation and reduction exothermic reaction of $$4FeO \rightarrow Fe + Fe_3O_4 \qquad (1)$$

The reaction releases heat to promote partial oxidation of sulfur compounds on the rubber surface at reduced reaction temperatures and times. The most preferable temperature and time for treating the crumb rubber using FeO catalyst are 150° C. and 20 min., respectively. Ferrous oxide ($Fe_2O_3$), on the other hand, reacts with the carbon molecules on crumb rubber surface at high temperatures through a reduction endothermic reaction of

$$2Fe_2O_3 + 3C \rightarrow 4Fe + 3CO_2 \qquad (2)$$

This reaction absorbs heat from the reactor thereby causing the partial oxidation of sulfur compounds on the crumb rubber surface at higher temperatures and longer treatment times than for those of FeO. The most preferable temperature and time for treating the crumb rubber using $Fe_2O_3$ catalyst are, respectively, 200° C. and 30 min., which are still significantly milder conditions than with treatment without a catalyst wherein much higher temperatures (250° C.) and longer reaction times (one hour) are required.

Example 4

Figure 6:
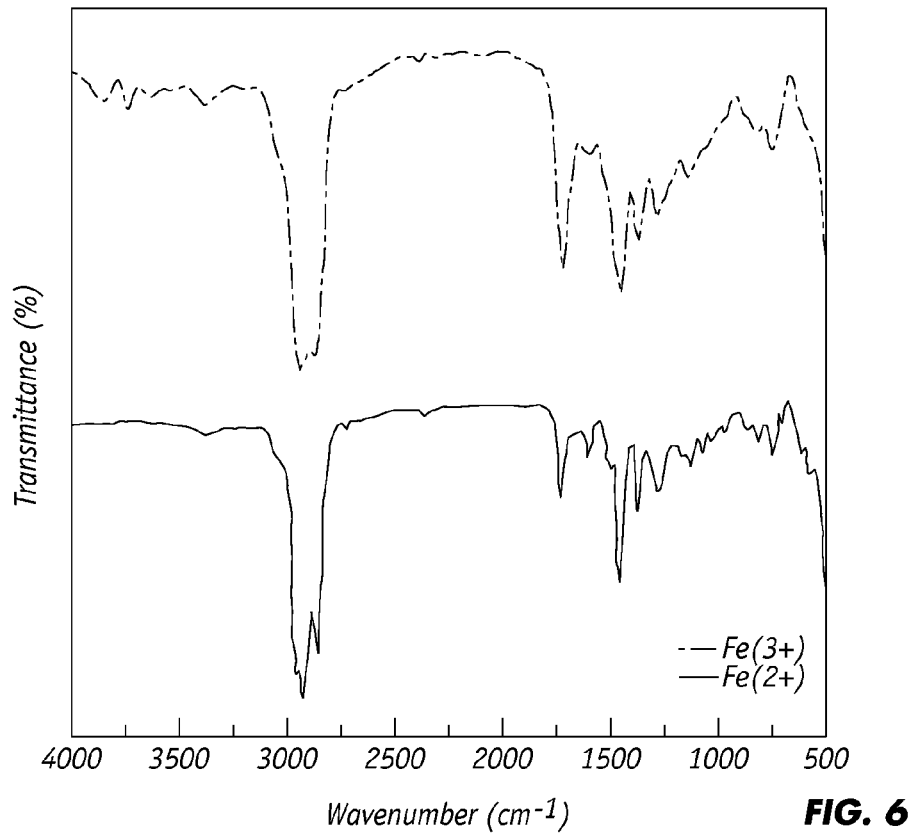
FIG. 6 is a FT-IR spectra of rubber oil generated from partial oxidation of rubber particles using FeO or $Fe_2O_3$ catalyst at 150° C. for 20 min. and at 200° C. for 30 min.

Rubber oil samples from experimental runs using both FeO or $Fe_2O_3$ catalyst at reaction temperatures of 150, 200, 250 and 300° C. and reaction times of 20, 30 and 60 min., respectively, were collected by rinsing the gas condensate from the reactor vessel with acetone and concentrated by evaporating the acetone from the samples. The concentrated rubber oil samples were then subject to FT-IR analysis. FIG. 6 shows the FT-IR spectra for the rubber oil generated from partial oxidation of the crumb rubber using FeO or $Fe_2O_3$ catalyst at 150° C. for 20 min. It is not surprising that the absorptions by C—H bond stretching and bending and by S=O bond stretching for the rubber oil are much stronger than those for the surface of partially oxidized crumb rubber (see FIG. 3). This is because the rubber oil is mostly made of short chain R—$SO_x$—R components (R—SO—R, R—$SO_2$—R, and R—$SO_3$). FIG. 6 also indicates that the absorption peaks of the rubber oil generated with $Fe_2O_3$ catalyst are clearly larger than those generated with FeO catalyst. This suggests that $Fe_2O_3$ catalyst causes a higher amount of over oxidation of the crumb rubber, where more sulfur molecules are driven from the surface of crumb rubber to form gaseous R—$SO_x$—R that is condensed as a part of the rubber oil. Higher over oxidation with the $Fe_2O_3$ catalyst is most likely caused by the additional heat generation in the reactor, which, in part is required by the endothermic reduction reaction of $Fe_2O_3$ as noted above.

Rubber oil generated from the waste tire rubber through partial oxidation with a metal oxide catalyst can be used as a bonding agent with properties that are equal to or better than those of conventional superplasticizers to enhance the bonding strength between the partially oxidized crumb rubber and the surrounding cement matrix.

In all experimental runs, homogeneous emulsified sulfide water was produced by capturing the heavy portion of gas condensate into the seal water at the bottom exit of the reactor. The principal functional groups in the gas condensate were mostly hydrophilic and water-soluble sulfones, sulfoxides, and organic sulfur trioxides. In addition to rubber oil, this sulfide water can be used as the water for hydration of the rubberized concrete to further improve its mechanical strength as a bonding agent between the rubber and surrounding cement particles.

Example 5

Rubberized cement made with partially oxidized crumb rubber with FeO catalyst at 150° C. for 20 min, and with $Fe_2O_3$ catalyst at 200° C. for 30 min. was compared to rubberized cement made with the crumb rubber treated under corresponding conditions but with no catalyst. For testing the following hydrated mortars were prepared:

1. RT Paste is paste that was prepared with cement/sand and 6 wt % as-received crumb rubber.
2. 150° C. Rubber Paste is paste that was prepared with cement/sand and 6 wt % crumb rubber partially oxidized at 150° C. for 20 min. without catalyst.
3. Fe(2+)+150° C. Rubber Paste is paste that was prepared with cement/sand and 6 wt % crumb rubber partially oxidized at 150° C. for 20 min. with FeO catalyst.
4. 200° C. Rubber Paste is paste that was prepared with cement/sand and 6 wt % crumb rubber partially oxidized at, 200° C. for 30 min. without catalyst.
5. Fe(3+)+200° C. Rubber Paste is paste that was prepared with cement/sand and 6 wt % crumb rubber partially oxidized at 200° C. for 30 min. with $Fe_2O_3$ catalyst.
6. Pure Paste is paste that was prepared with cement/sand only.

Water was added to the mixtures at a weight ratio of 0.62:1 for the hydration to prepare the paste specimens, which were allowed to cure for 7 days before testing.

Example 6

Figure 7:
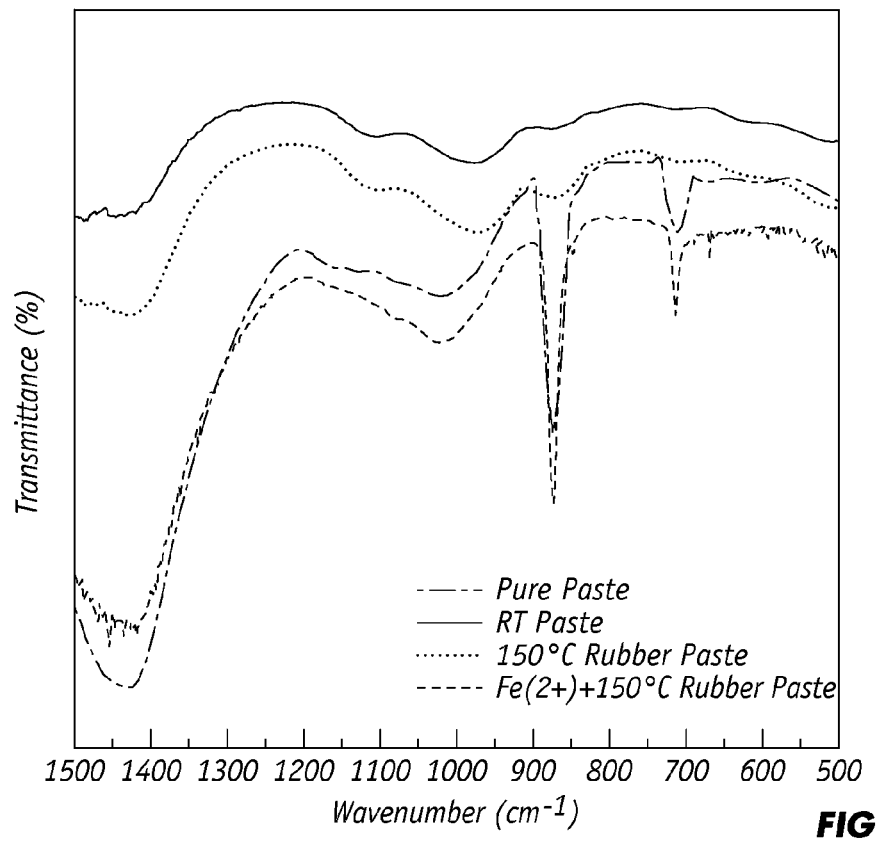
FIGS. 7 and 8 are the FT-IR spectra of hydrated mortars.

FT-IR spectroscopy analysis of hydrated mortar specimens prepared in Ex. 5 confirmed the superior properties of rubberized concrete derived with the catalytically oxidized crumb rubber. As shown in FIG. 7, the FT-IR spectrum of Fe(2+)+150° C. rubber paste demonstrates significantly stronger C—S—H signals than that of the pure paste (ordinary paste) in the vicinity of 878, 670 and 1000 $cm^{-1}$ wave number. As mentioned above, $C_3S$ and $C_2S$ are the main ingredients in cement that produce C—S—H during hydration as the main compound that gives paste its mechanical strength. The FT-IR spectra for RT paste and 150° C. rubber paste show no significant C—S—H signals, which means that there is no R—$SO_x$—R functional group on the surface of as-received crumb rubber and only a few R—$SO_x$—R functional groups formation on the crumb rubber surface partially oxidized at 150° C. and 20 min. with no catalyst.

Figure 8:
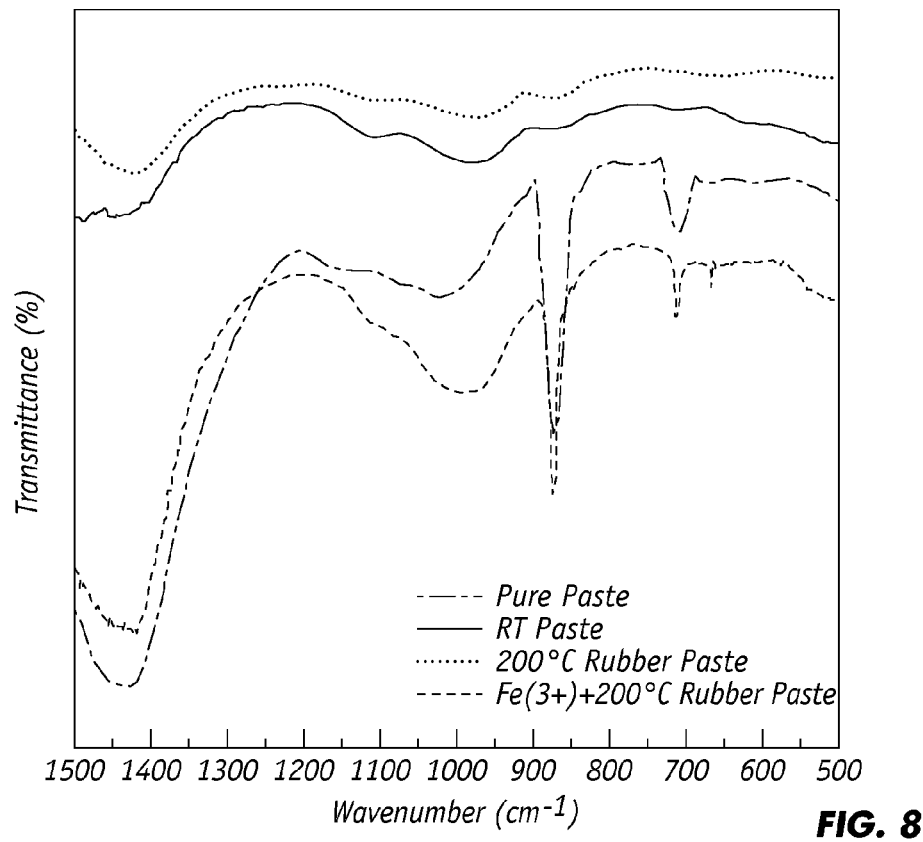

The FT-IR spectrum, of Fe(3+)+200° C. rubber paste shown in FIG. 8 also demonstrates significantly stronger C—S—H signals than that of the pure paste (ordinary paste) in the vicinity of 878, 670 and 1000 $cm^{-1}$ wave number. The FT-IR spectra for RT paste and 150° C. rubber paste show no significant C—S—H signals and, therefore, relatively weak mechanical strength.

Example 7

Figure 9:
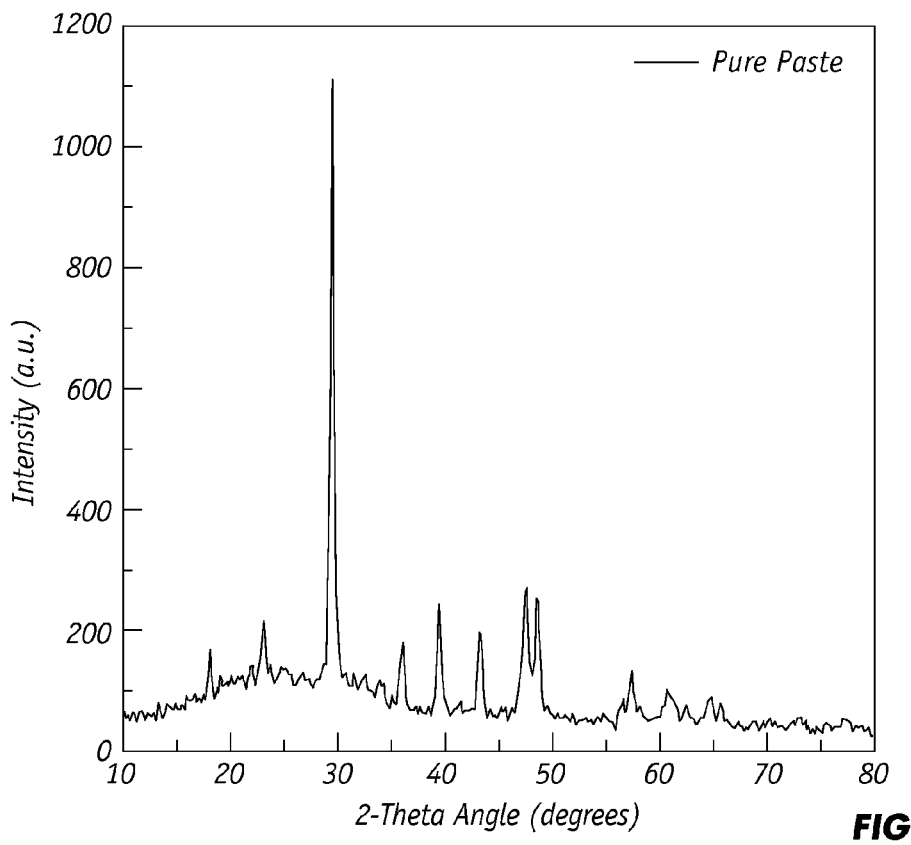
FIGS. 9-13 are x-ray diffraction spectra of hydrated mortars.
Figure 10:
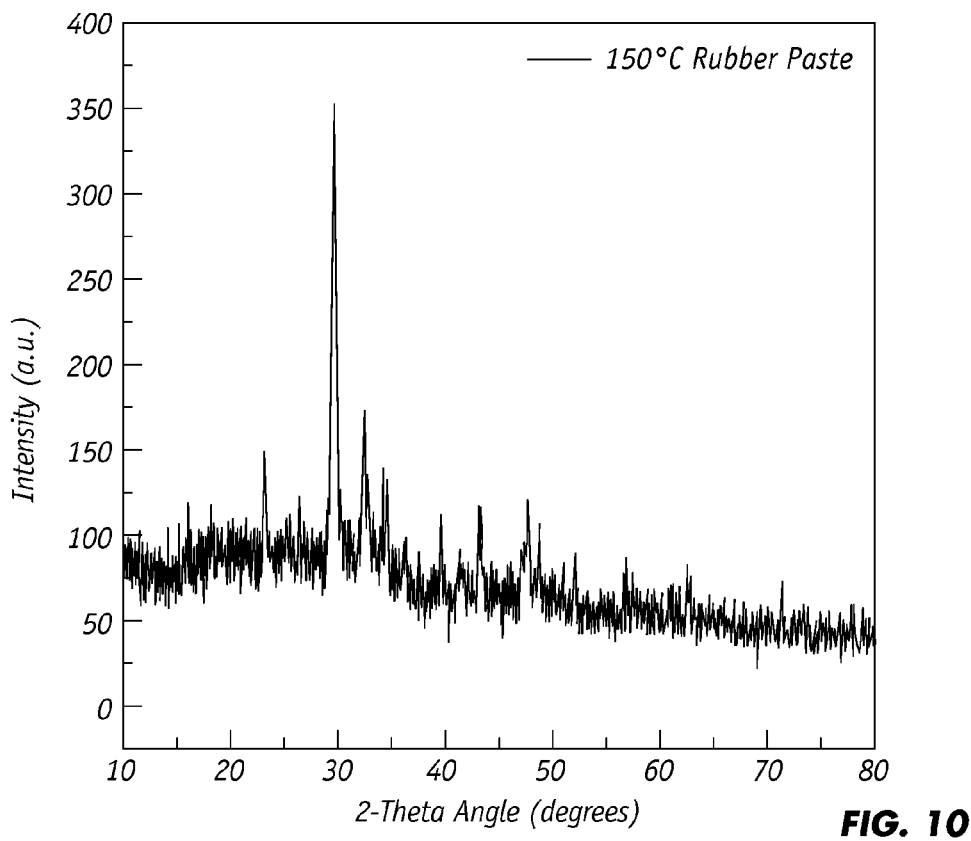
Figure 11:
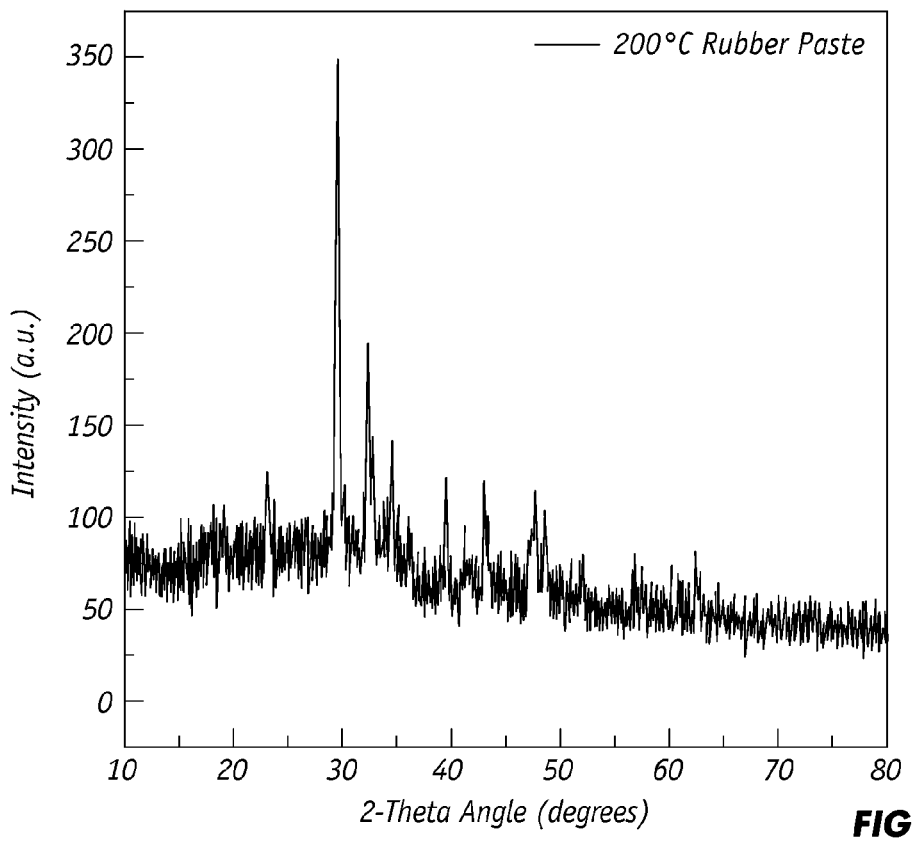

To further demonstrate the benefit of using catalytically oxidized crumb rubber relatively to non-catalytically oxidized crumb rubber in making rubberized concrete, some of the hydrated mortar specimens prepared in Ex. 5 were analyzed with x-ray diffraction (XRD) spectrometry. The XRD spectrum of pure paste (ordinary paste) presented in FIG. 9 shows the crystalline peak of $C_3S/C_2S/C$—S—H as the base case. This crystalline peak is significantly lower in the XRD spectra for both 150° C. rubber paste and 200° C. rubber paste, respectively, as shown in FIGS. 10 and 11, suggesting that these rubberized concretes have weaker mechanical strength than ordinary concrete.

Figure 12:
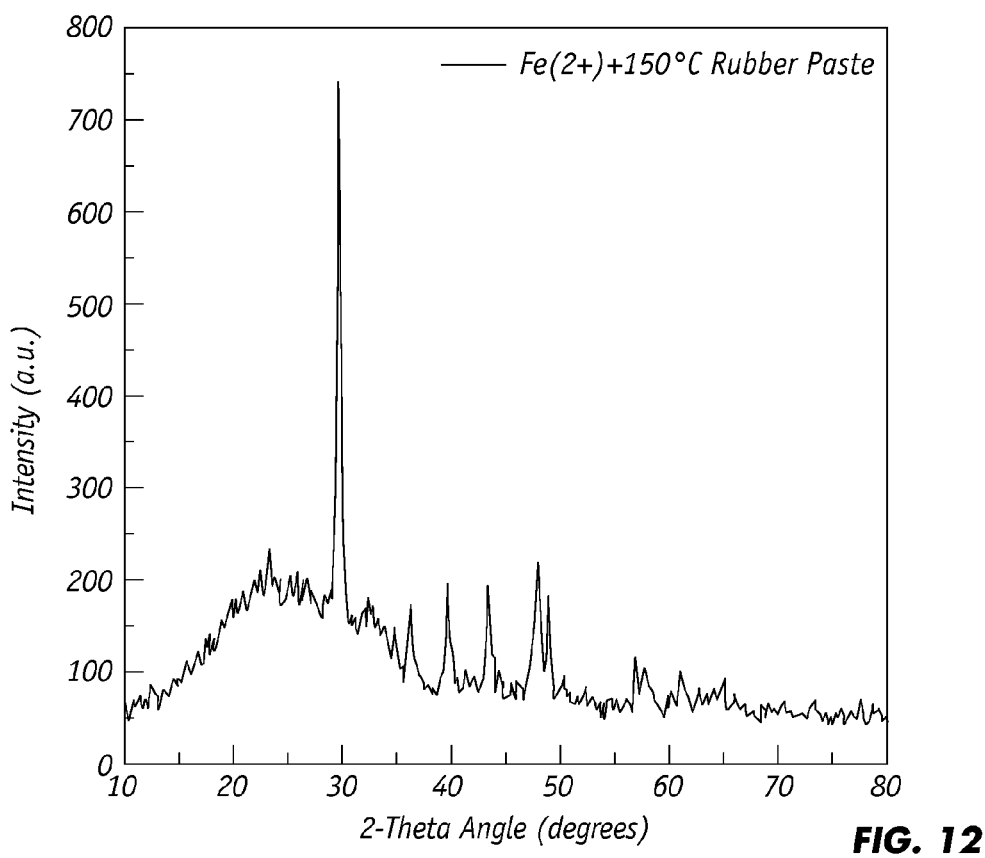
Figure 13:
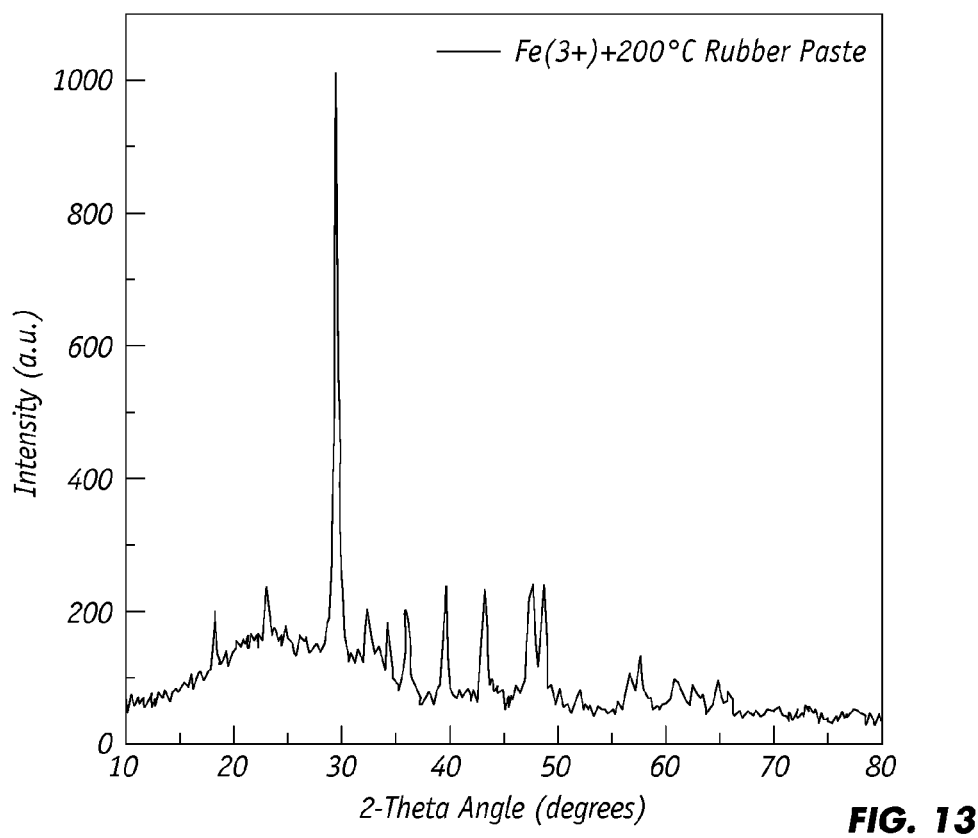

However, as shown in FIGS. 12 and 13, crystalline peaks of $C_2S/C_2S/C$—S—H in the XRD spectra of Fe(2+)+150° C. Rubber Paste and Fe(3+)+200° C. Rubber Paste are similar or even larger than that of pure paste (ordinary paste). This example further confirms that partial oxidation of crumb rubber with metal oxide catalysts at low temperatures and short treatment times does indeed improve the strength of rubberized concrete containing such oxidized crumb rubber.

Example 8

Figure 14:
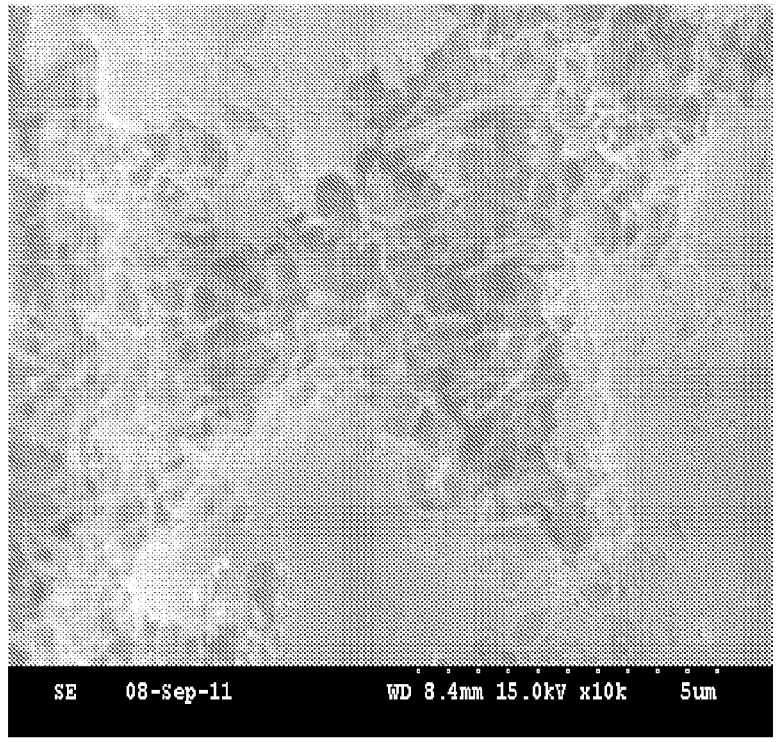
FIG. 14 is a SEM of a rubberized concrete sample.

Scanning electron microscopy (SEM) was used to compare the crystal and surface morphology of the hydration products of rubberized concrete samples that consisted of catalytically oxidized and non-catalytically oxidized crumb rubber. As shown in FIG. 14, surface morphology of the rubberized concrete sample made from Fe(2+)+150° C. Rubber Paste shows a fine needle crystalline surface and no observable interface between catalytically oxidized crumb rubber and cement. This surface morphology is similar to the SEM image of hydrated mortar comprising ordinary paste and a superplasticizer showing the Ettringite needle crystalline surface. Results from this example suggest that the catalytically oxidized crumb rubber is an excellent superplasticizer to improve the mechanical strength and shorten the hydration time of the rubberized concrete.

Example 9

Figure 15:
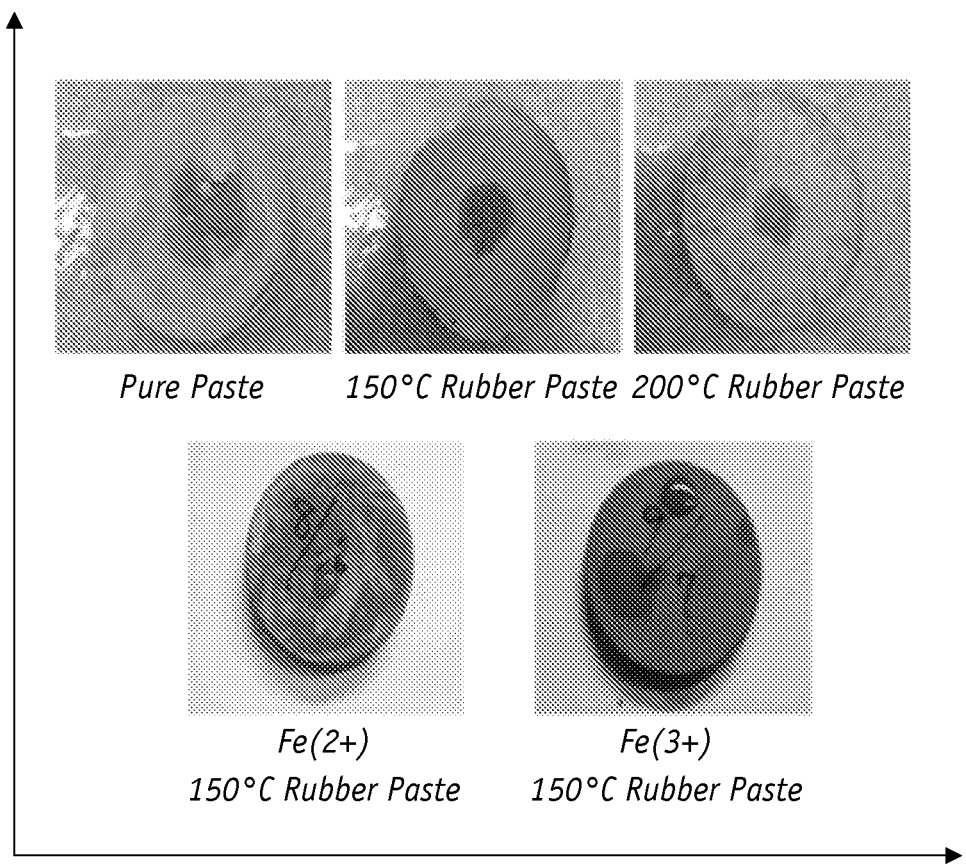
FIG. 15 are images of various hydrated mortar samples.

Rubberized paste has improved water-repelling surface properties as compared to ordinary paste but the improvement is quite limited due to the poor compatibility between the hydrophobic crumb rubber and the hydrophilic cement, when the rubberized hydrated mortar is made with cement and either (i) untreated crumb rubber or (ii) partially oxidized crumb rubber derived without catalyst. Surprisingly, rubberized hydrated mortar made from cement and catalytically oxidized crumb rubber has substantially improved water repealing capability. FIG. 15 are images of the 28-day hydrated mortars of pure paste, 150° C. rubber paste, 200° C. rubber paste, Fe(2+)+150° C. rubber paste and Fe(3+)+200° C. rubber paste. The water repelling properties of Fe(2+)+150° C. rubber paste, and Fe(3+)+200° C. rubber paste are clearly superior to those of the pure paste and other pastes containing non-catalytically oxidized rubber.

What is claimed is:

1. A method of oxidizing rubber particles to produce partially oxidized rubber that comprises contacting rubber particles with an oxidant gas in the presence of a catalyst under conditions sufficient to selectively oxidize the rubber particles, which comprise polymers that are cross-linked by organic sulfur compounds, such that organic sulfur compounds on the surface of the particles are converted into functional groups that are selected from the group consisting of the sulfoxides (R—SO—R), sulfones (R—SO$_2$—R), sulfur trioxides (R—SO$_3$) and mixtures thereof, wherein R represents hydrocarbons in the polymers of the rubber particles and wherein the catalyst comprises a metal oxide.

2. The method of claim 1 wherein the rubber particles are exposed to the oxidant gas at a temperature of between 25 to 300° C. and for 5 to 60 minutes.

3. The method of claim 1 wherein the rubber particles are exposed to the oxidant gas at a temperature of between 50 to 250° C. and for 10 to 45 minutes.

4. The method of claim 1 wherein selective oxidation of the rubber particles produces a gas condensate that is suitable as a bonding agent.

5. The method of claim 1 wherein the metal oxide is selected from the group consisting of a metal oxide of iron, vanadium, titanium, chromium, manganese, cobalt, nickel, zinc, copper, calcium, potassium, sodium, magnesium, and mixtures thereof.

6. The method of claim 1 wherein the metal oxide comprises ferrous oxide (FeO), ferric oxide (Fe$_2$O$_3$), or mixtures thereof.

7. The method of claim 1 wherein the rubber particles are recovered from waste tires.

8. A continuous catalytic reactor system for selectively oxidizing rubber particles comprising:
a catalytic reactor, having a rubber particles inlet and a rubber particles outlet, in which entering rubber particles are contacted with a metal oxide catalyst in the presence of an oxidant;
means for continuously introducing rubber particles through the rubber particles inlet and into the catalytic reactor; and
means for covering partially oxidized rubber particles and gas condensate.

9. The reactor system of claim 8 wherein the means for continuously introducing rubber particles includes means for mixing the metal oxide catalyst and rubber particles as the rubber particles proceeds through the reactor toward the rubber particles outlet.

10. The reactor system of claim 8 comprising means for introducing preheated oxygen gas into the catalytic reactor.

11. The reactor system of claim 10 wherein the catalytic reactor has an elongated reaction zone and oxygen gas flows through the reaction zone concurrently with the rubber particles.

12. The reactor system of claim 8 wherein the rubber particles are recovered from waste tires, mechanically grounded and screened into irregular particles with desirable sizes in the range of 100-1000 μm.

13. A concrete composition that comprises cement and surface-treated crumb rubber particles, which comprise polymers that are cross-linked by organic sulfur compounds, that are partially oxidized and have sulfur-containing, hydrophilic reactive functional groups that are reactive to hydrophilic groups present in cement matrix and a liquid, bonding agent wherein the liquid bonding agent comprises at least 0.1 wt % of the concrete composition wherein the surface-treated crumb rubber particles and the bonding agent are prepared by a process that comprises:
oxidizing rubber particles to produce partially oxidized rubber that comprises contacting rubber particles with an oxidant gas in the presence of a catalyst under conditions sufficient to selectively oxidize the rubber particles, which comprise polymers that are cross-linked by organic sulfur compounds, such that organic sulfur compounds on the surface of the particles are converted into functional groups that are selected from the group consisting of the sulfoxides (R—SO—R), sulfones (R—SO$_2$—R), sulfur trioxides (R—SO$_3$) and mixtures thereof, wherein R represents hydrocarbons in the polymers of the rubber particles and wherein the catalyst comprises a metal oxide.

14. The concrete composition of claim 13 wherein the concrete composition when cured has a compressive strength that is greater than that of conventional non-rubberized concrete.

15. The concrete composition of claim 13 wherein the concrete composition when cured has a flexural strength that is greater than that of conventional non-rubberized concrete.

16. The concrete composition of claim 13 wherein the concrete composition when cured has a tensile strength that is greater than that of conventional non-rubberized concrete.

17. The concrete composition of claim 13 wherein the concrete does not include a superplasticizer.

18. The concrete composition of claim 13 wherein the catalyst is the metal oxide is selected from the group consisting of a metal oxide of iron, vanadium, titanium, chromium, manganese, cobalt, nickel, zinc, copper, calcium, potassium, sodium, magnesium, and mixtures thereof.

19. The concrete composition of claim 18 wherein the metal oxide comprises ferrous oxide (FeO), ferric oxide ($Fe_2O_3$), or mixtures thereof.

20. The concrete composition of claim 13 wherein the rubber particles are recovered from waste tires.

* * * * *